V. PLUGHOFF.
FRUIT STRAINER.
APPLICATION FILED FEB. 9, 1920.

1,362,135.

Patented Dec. 14, 1920.

WITNESSES
E. A. Buchanan.

INVENTOR
V. Plughoff,
BY
ATTORNEYS

UNITED STATES PATENT OFFICE.

VALERIA PLUGHOFF, OF HUNTINGTON, OREGON.

FRUIT-STRAINER.

1,362,135.     Specification of Letters Patent.     Patented Dec. 14, 1920.

Application filed February 9, 1920. Serial No. 357,397.

*To all whom it may concern:*

Be it known that I, VALERIA PLUGHOFF, a citizen of the United States, and a resident of Huntington, in the county of Baker and State of Oregon, have invented certain new and useful Improvements in Fruit-Strainers, of which the following is a specification.

My invention relates to strainers adapted for use in the straining of juices in the making of jelly and jam, the purpose of my invention being the provision of a strainer which is adapted to be used in conjunction with a cooking vessel whereby the fruit may be strained directly into the vessel thus eliminating the necessity of removing the juices to some other vessel for a final cooking.

I will describe one form of strainer and one form of cooking vessel each embodying my invention and will then point out the novel features thereof in claims.

In the accompanying drawings:—

Similar reference characters refer to similar parts in each of the several views.

Figure 4:
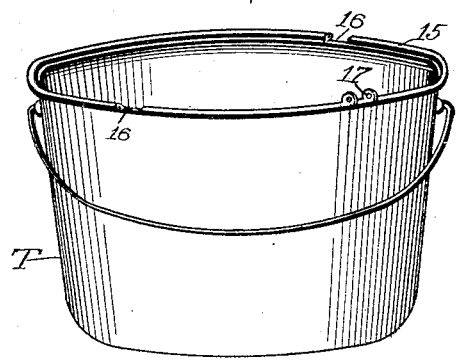
Fig. 4 is a perspective view of the cooking vessel shown in Fig. 1.

Referring specifically to the drawings, and particularly to Fig. 4, T designates a cooking vessel of standard construction, with the exception that its upper edge is provided with a bead 15 which is recessed at diametrically opposite points, as at 16, and provided with a pair of spaced ears 17.

Figure 3:
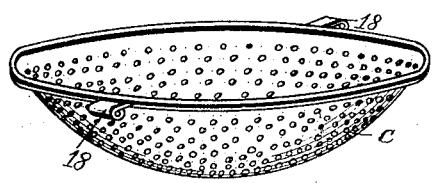
Fig. 3 is a perspective view of the colander embodied in the strainer shown in Fig. 1.

As shown in Fig. 3, C designates a colander which in the present instance is of concave formation and of a diameter slightly less than the internal diameter of the vessel T. The upper edge of the colander C is provided at diametrically opposite points with extensions 18 that are adapted to repose within the recessed portion 16 when the colander is in applied position within the vessel.

Figure 1:
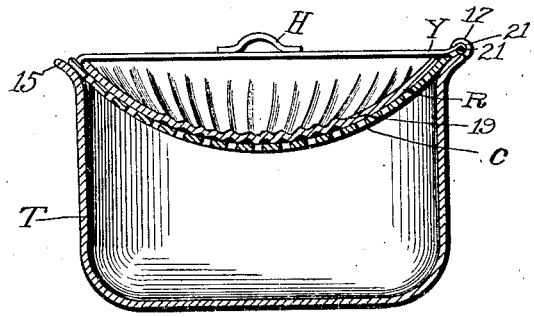
Figure 1 is a view, showing in vertical section one form of strainer and one form of cooking vessel, each embodying my invention.
Figure 2:
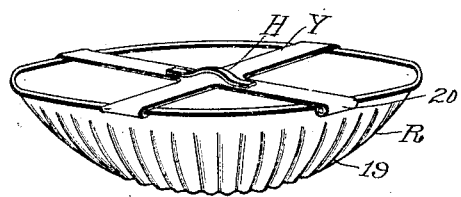
Fig. 2 is a perspective view of the pressing member which constitutes a part of the strainer shown in Fig. 1.

As shown in Fig. 2, R designates a pressing member which is of convex formation so as to fit within the colander C. This pressing member is provided on its under side with radially extending corrugations 19 that are adapted to coact with the upper surface of the colander in effecting a thorough pressing of the fruit contained in the colander. The pressing member R carries at its upper side a yoke Y which is composed of a plurality of radially extending arms that are secured at their free ends to the upper edge of the pressing member. The yoke Y carries at its center a handle H which is adapted to be gripped in the manipulation of the pressing member, it being understood that the yoke Y forms a substantial support for the handle and prevents collapsing of the pressing member. One of the arms comprised in the yoke Y is bent at its outer end to provide a sleeve 20 which in the applied position of the pressing member as shown in Fig. 1, is adapted to coact with a bolt 21 inserted through the ears 17 and the sleeve for hingedly supporting the pressing member upon the vessel T.

With the parts assembled, as shown in Fig. 1, the fruit is placed within the colander C, and by actuating the pressing member vertically, a pressing of the fruit is effected so that the juices contained therein are forced through the perforations of the colander into the vessel T. The juices are supposed to remain within the vessel T so that after the straining operation has been completed the final cooking of the juices is made within the vessel T. This eliminates the necessity of removing the juices to another vessel as is the case in the ordinary manner of straining fruit.

When the pressing member is used for the purpose of pressing fruit in the making of jelly, the bolt 21 is removed from the ears 17 and the sleeve 20 so that the pressing member is free to be moved vertically in effecting a pressing of the fruit, it being understood that the pressing member is hingedly connected to the colander only when the device is used in the pressing of fruit in the making of jam.

From the foregoing description, taken in connection with the accompanying drawings, it will be manifest that I have provided a simple and efficient device for the straining of fruit whereby, the necessity of removing the juices to another vessel for the final cooking is eliminated. It will be further manifest that the device is of simple construction, and is capable of thoroughly straining fruits and directly into the cooking vessel.

Although I have herein shown and described only one form of strainer and cooking vessel embodying my invention, it is to be understood that various changes and modifications may be made herein without departing from the spirit of the invention and the spirit and scope of the appended claims.

Having thus described my invention, I claim:

1. In combination, a cooking vessel, a colander supported within the vessel, a pressing member adapted to fit within the colander and formed with corrugations, and means for hingedly supporting the pressing member on the cooking vessel.

2. In combination, a cooking vessel having its upper edge recessed at diametrically opposite points, a concave colander adapted to fit within the cooking vessel, extensions formed at diametrically opposite points upon said colander and adapted to fit within said recesses, a concave pressing member adapted to fit within the colander and formed with corrugations, a yoke secured to the upper side of the pressing member and comprising radially extending arms, one of said arms being bent to form a sleeve, pivot ears formed on the upper edge of the cooking vessel, and a bolt extending through said sleeve and ears for hingedly supporting the pressing member upon the cooking vessel.

Mrs. VALERIA PLUGHOFF.